US006618431B1

(12) United States Patent
Lee

(10) Patent No.: US 6,618,431 B1
(45) Date of Patent: Sep. 9, 2003

(54) PROCESSOR-BASED METHOD FOR THE ACQUISITION AND DESPREADING OF SPREAD-SPECTRUM/CDMA SIGNALS

(75) Inventor: Yuan K. Lee, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/224,180

(22) Filed: Dec. 31, 1998

(51) Int. Cl.$^7$ ................................................. H04B 1/69
(52) U.S. Cl. ...................................... 375/147; 375/150
(58) Field of Search ............................... 375/130, 135, 375/136, 147, 150, 142; 370/342

(56) References Cited

U.S. PATENT DOCUMENTS

| | | | |
|---|---|---|---|
| 5,500,811 A | | 3/1996 | Corry |
| 5,764,687 A | | 6/1998 | Easton |
| 6,009,117 A | * | 12/1999 | Yamaura ..................... 375/206 |
| 6,031,862 A | * | 2/2000 | Fullerton et al. ........... 375/200 |
| 6,072,823 A | * | 6/2000 | Takakusaki ................. 375/208 |
| 6,075,809 A | * | 6/2000 | Naruse ........................ 375/147 |
| 6,097,972 A | * | 8/2000 | Saints et al. ................ 455/572 |
| 6,122,311 A | * | 9/2000 | Watanabe et al. ........... 375/147 |
| 6,289,041 B1 | * | 9/2001 | Krasner ....................... 375/152 |
| 6,330,233 B1 | * | 12/2001 | Miya et al. ................. 370/342 |
| 6,330,271 B1 | * | 12/2001 | Klang et al. ................ 375/134 |
| 6,359,875 B1 | * | 3/2002 | Hamada et al. ............. 370/342 |
| 6,456,611 B1 | * | 9/2002 | Hu et al. ..................... 370/342 |

FOREIGN PATENT DOCUMENTS

EP  EU 0 577 044 A1  5/1994

OTHER PUBLICATIONS

Gilhousen, Klein S., "Optimum Bandwidth for CDMA", Adapted from a presentation at the International Conference on Personal, Mobile Radio, and Spread Spectrum Communications Beijing, China (Oct. 12–14, 1994) www.cdg–org/a_ross/OptBW.html.

Nikolai, Dirk and Kammeyer, Karl–Dirk, "NonCoherent RAKE–Receiver with Optimum Weighted Combining and Improved Closed–Loop Power Control", *Depart of Communications*, Bremen University.

Benthin, M. Kammeyer, K.D., "Viterbi Decoding of Convolutional Codes with Reliability Information for Noncoherent RAKE–Receiver in a CDMA–Environment", GLOBECOM '94 Conference, San Francisco (Nov. 27–Dec. 1, 1994).

* cited by examiner

*Primary Examiner*—Don N. Vo
*Assistant Examiner*—Dung X. Nguyen
(74) *Attorney, Agent, or Firm*—Frederick J. Telecky, Jr.; W. James Brady, III

(57) ABSTRACT

A digital signal processing architecture is disclosed which is operable to receive a spread-spectrum/CDMA signal and perform the despreading operation thereon. The quadrature and in-band components of the signal ($r_I$, $r_Q$) are received and stored in a memory. The digital signal processor is operable to execute a plurality of single instructions in a sequential manner, one for each instruction cycle. Each of these single instructions cause data to be extracted from the memory, processed and an output provided in the form of a despread signal ($R_I$, $R_Q$). The process is performed in response to the generation of the single instruction by placing in the data path a DSP process that will perform the despreading operation by performing various multiplications, summations, and accumulations, all in a single instruction cycle.

18 Claims, 3 Drawing Sheets

PROCESSOR-BASED METHOD FOR THE ACQUISITION AND DESPREADING OF SPREAD-SPECTRUM/CDMA SIGNALS

TECHNICAL FIELD OF THE INVENTION

The present invention is related in general to the reception of spread-spectrum signals, and more specifically, to a general-purpose processor implementation of a RAKE receiver.

BACKGROUND OF THE INVENTION

Code Division Multiple Access (CDMA) is one multiple access technique among the more classical schemes of Frequency Division Multiple Access (FDMA) and Time Division Multiple Access (TDMA). FDMA separates channels by putting them on different frequencies, while TDMA separates them by allocating different time-slots on the same frequency to a sender and receiver. In contrast, users in a CDMA cellular environment simultaneously share the same radio frequency band and can be separated at the receiver end with knowledge of the user's unique spreading code. This separation or despreading is performed using a RAKE receiver.

One of the main advantages of CDMA systems is the capability of using signals that arrive at the receivers with different time delays. This phenomenon is called multipath. FDMA and TDMA, which are narrowband systems, cannot discriminate between the multipath arrivals, and resort to equalization to mitigate the negative effects of multipath. Due to its wide bandwidth and RAKE receivers, CDMA uses the multipath signals and combines them to make an even stronger signal at the receiver.

The RAKE receiver is necessary for capturing a significant fraction of the received signal power of a spread spectrum signal in a multipath environment, and is essentially a set of, for example, four receivers. One of the receivers (also called "fingers") constantly searches for different multipaths and feeds the information to the remaining fingers. Each finger then demodulates the signal corresponding to a strong multipath. The results are then combined to make the signal stronger. Referring now to FIG. 1, there is illustrated a conventional RAKE receiver 100 for use in a base station, or mobile station. Received signals from an antenna array 102 are all downconverted using an RF/IF converter 104, amplified, and converted to digital form in a bank of analog-to-digital (A/D) converters 106. One RAKE receiver is provided for each active traffic channel, and a selected subset of the sampled antenna signals is presented at the output of the A/Ds 106 to each RAKE receiver 100. The RAKE receiver 100 contains, typically, four correlation receivers 110 and a searcher 112. The searcher 112 also contains one or more correlators. The searcher 112 continuously scans a delay hypothesis window, typically several microseconds in duration, looking for signal energy from the mobile client. Detections are noted, and the correlation receivers 110 are assigned to the strongest four signals via a controller 114 controlling a matrix switch 108. Multiple search correlators may be necessary since the signal components being sought are so weak, and the multipath constantly changes due to location of the mobile unit. The output signals of the respective correlation receivers 110 are then combined using a combiner 116, which combiner outputs the signal to a decoder for decoding. Closed-loop power control maintains the received signal-to-noise ratio (SNR) at a very low value for the combined signal by sending control signals to the mobile unit to boost or lower the signal power. Each of the multipath components has an even lower SNR. Because of the relatively low SNRs, relatively long time integration is necessary for reliable detection. Multiple correlators 110, searching simultaneously, thus may be needed for adequate speed. Increasing spread bandwidth can only result in more complex implementations. For example, increasing the spread bandwidth requires that the correlators 110 operate at higher speeds. The increased speed requires greater silicon area and greater power consumption. In addition, many more correlators 110 are required to adequately process the multipath signals.

SUMMARY OF THE INVENTION

The invention disclosed and claimed herein is a method of despreading a spread spectrum signal. A continuous digital data stream of encoded symbol data (also known as the "spread chip data," "spread data," or "chip data") is received at a data rate. Each symbol data, when received, is stored in a buffer. A digital processing device processes the received and buffered symbol data by generating a plurality of single process instructions at least at the data rate of the digital data stream, which a sequence of single process instructions is operable to generate despread symbol data. The next single process instruction operates on the next frame of symbol data (also known as N chips of data, where N is the spreading factor) in the received digital data stream, and so on for each symbol data of a particular symbol time of data.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
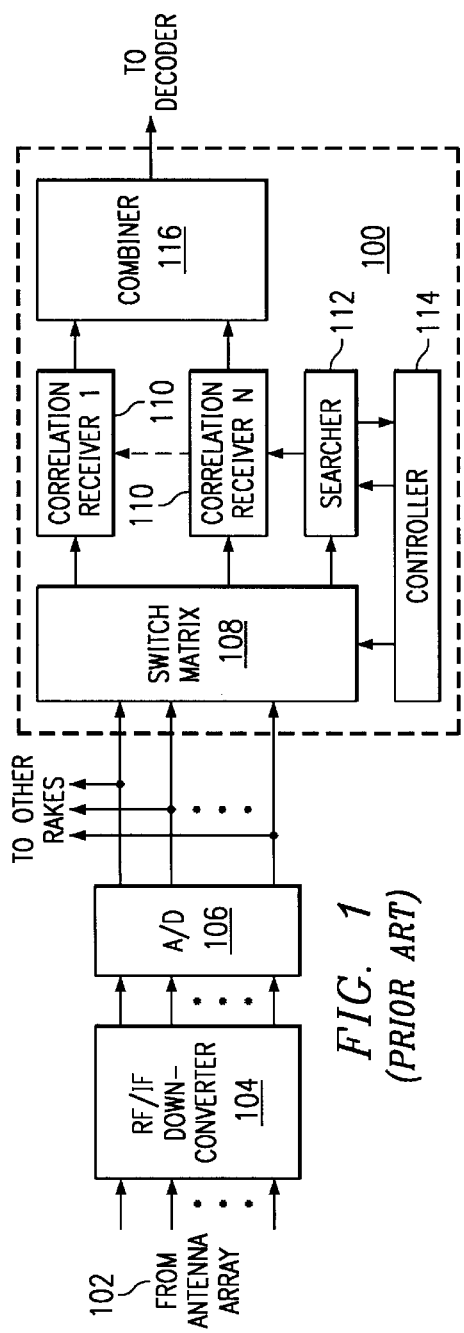
FIG. 1 illustrates a Prior Art RAKE receiver for use in a base station.

The despreading operation of the spread-spectrum RAKE receiver consists of a process involving multiply-and-accumulate (MAC) operations for complex valued quantities where one operand consists of the in-band (I) and quadrature (Q) samples, and the other operand consists of the corresponding I and Q pseudo-noise (PN) samples. Because the PN sequence is a sequence of +1 and −1 for the I and Q components, the despreading process is considerably more simple than a MAC operation for arbitrary complex values. By adding to a general-purpose digital signal processor (DSP) architecture the capability of performing a conditional addition in one or a small number of cycles, the general-purpose DSP can perform despreading very quickly.

In an existing processor, for example, the C54x DSP manufactured by Texas Instruments, 4N clock cycles are required to perform the despreading of the complex I and Q sample components, where N is the number of I and Q, and PN samples (or spreading factor) involved in the correlation. With the specialized architecture disclosed herein, the number of clock cycles could be reduced to N, a significant reduction in terms of clock cycles. The process may be implemented in software through a single instruction called Quadrature DeSPread (QDSP) which would initiate the spread-spectrum despreading process more efficiently. Having the QDSP instruction would reduce the number of cycles of the C54x DSP by a factor of four (4) compared to that required by using the current DSP instruction set. When used with a low-complexity hardware peripheral to bring both the I and Q components and the PN values into DSP memory, this reduction in computation time will allow the DSP to perform code acquisition very quickly. The introduction of this disclosed invention opens up an application area for the DSP that has, up to this time, used exclusively application-specific hardware.

The following is a description of the problem. Let $\underline{r}(n) = r_I(n) + j r_Q(n)$ be the complex representation of the in-phase (I) and quadrature (Q) baseband samples, where n is the time index in PN "chips." Let $\underline{c}(n) = c_I(n) + j c_Q(n)$ represent the complex I and Q PN sequences, where $c_I(n)$, $c_Q(n) = \{\pm 1\}$. Let N be the number of samples over which despreading takes place. The despreaded signal, $\underline{R}$, undergoes the following operation:

$$\underline{R} = \sum_{n=0}^{N-1} \underline{r}(n) \underline{c}^*(n) \quad (\text{EQ 1})$$

where $\underline{c}^*(n)$ is the complex conjugate of $\underline{c}(n)$. Thus, the real and imaginary parts of $\underline{R}$ are, respectively:

$$R_I = \sum_{n=0}^{N-1} (r_I(n) c_I(n) + r_Q(n) c_Q(n)) \quad (\text{EQ 2})$$

and $$R_Q = \sum_{n=0}^{N-1} (-r_I(n) c_Q(n) + r_Q(n) c_I(n)) \quad (\text{EQ 3})$$

Thus, it can be seen that 4N MAC operations using, for example, the C54x DSP chip, would be required to compute the despread signal $\underline{R}$ (i.e., $r_I(n)c_I(n)$, $r_Q(n)c_Q(n)$, $-r_I(n)c_Q(n)$, and $r_Q(n)c_I(n)$). (Alternatively, conditional adds and subtracts can be used, and will also take 4N operations.) Since the PN sequence terms $c_I(n)$ and $c_Q(n)$ only take the values of +1 or −1, the current MAC operation, owing to its generality of multiplying two arbitrary operands, does not efficiently compute the despread signal $\underline{R}$.

Figure 2:
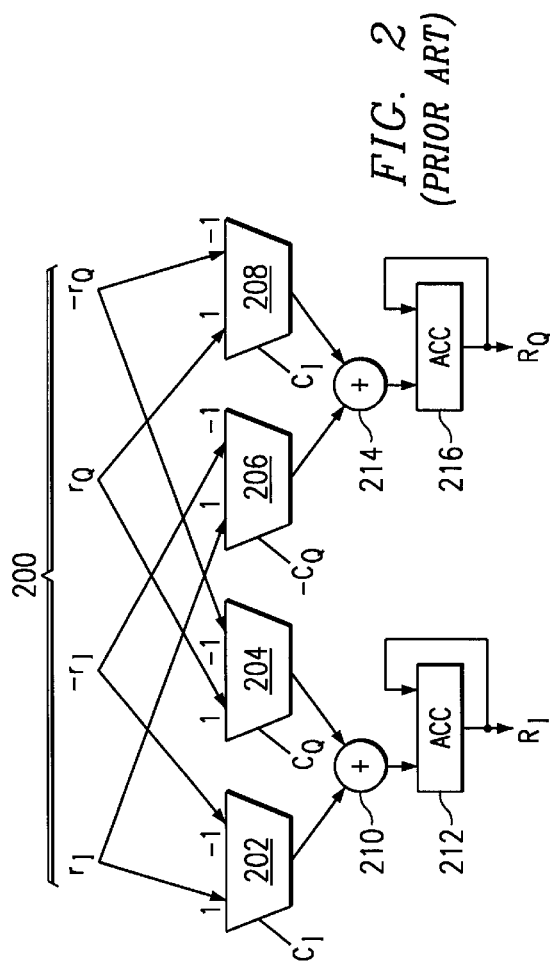
FIG. 2 illustrates an architecture for computing the value of R using a "conditionally select and accumulate" unit.

There are many ways to represent the simplicity in computing $\underline{R}$. Referring now to FIG. 2, there is illustrated a conventional quadrature despreading process for use in a base station, a special case of MAC operations with complex values, using a "conditionally select and accumulate" unit. The dispreading process occurs by taking the incoming signal in-band and quadrature values, $r_I$ and $r_Q$, and performing a correlation operation with the PN code in-band quadrature parameters, $c_I$ and $C_Q$. In this particular representation, four multiplexer blocks are used. A multiplexer block 202 multiplexes the in-band parameters±$r_I$, with the respective complementary inputs of the multiplexer block 202 and the in-band parameter of the PN code, $c_I$. Similarly, a multiplexer block 204 multiplexes the quadrature parameter of the incoming signal, $r_Q$ and −$r_Q$, with the ±1 inputs of the multiplexer block 204 and the PN code quadrature value $r_Q$ to obtain the desired output at that multiplexer block 204. Subsequently, the outputs of multiplexer blocks 202 and 204 are summed with a summer 210 prior to being inserted into an accumulator 212, the output of which is the $R_I$ value. A multiplexer block 206 multiplexes the values of 1 and −1 with the respective incoming signal in-band parameters $r_I$ and −$r_I$, with the PN code quadrature value of −$c_Q$ to obtain the desired output at the multiplexer block 206. Similarly, a multiplexer block 208 multiplexes the values of 1 and −1 with the quadrature parameters of the incoming signal $r_Q$ and −$r_Q$ and the in-band portion of the PN code $c_I$ to obtain the desired output of that particular multiplexer block 208. The outputs of multiplexer blocks 206 and 208 are then summed with a summer 214 prior to insertion into an accumulator 216, which accumulator 216 outputs the quadrature value $R_Q$.

If the intermediate and final values of $R_I$ and $R_Q$ do not exceed sixteen bits each, then it is clear that a 32-bit accumulator can accommodate the real and imaginary summations simultaneously. Assuming that individual values of $r_I(n)$ and $r_Q(n)$ are eight bits or less, N can be as large as 128 for $R_I$ and $R_Q$ to remain at sixteen bits or less. The 8-bit assumption is safe for handset applications where typical bit values are between five to eight bits. For the case where the combination of N and the precision of $r_I(n)$ and $r_Q(n)$ would result in $R_I$ and $R_Q$ exceeding sixteen bits, the computations can be broken down into stages where each stage has a smaller value of N.

Figure 3:
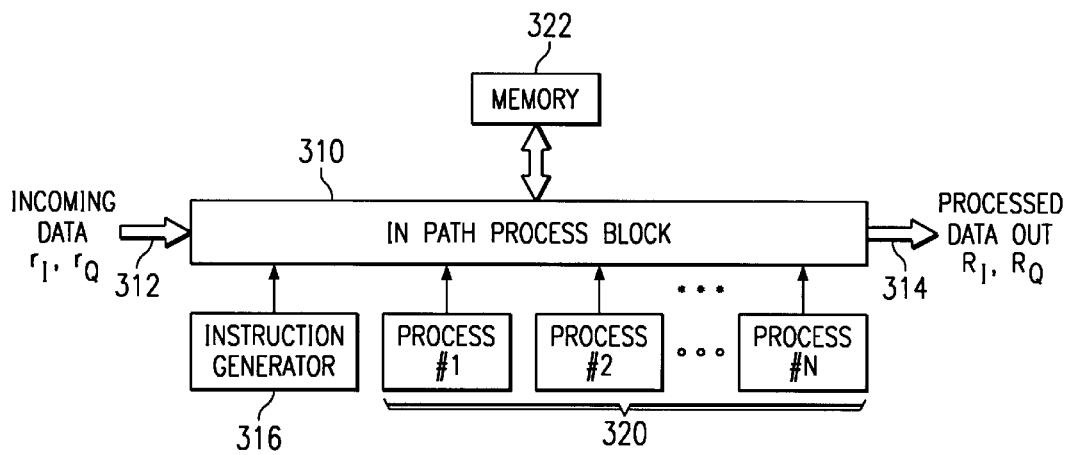
FIG. 3 illustrates a DSP implementation which uses the single instruction QDSP for initiating the decoding process.

Referring now to FIG. 3, there is illustrated a block diagram of a portion of a DSP for receiving incoming data, processing that data, and providing the appropriate output. The input data in the disclosed embodiment is the in-band parameters $r_I$ and the quadrature parameters $r_Q$ of the spread spectrum signal and the output consists of the despread in-band parameters $R_I$ and quadrature parameters $R_Q$. During this process, the data is received at a predetermined data rate such that spread chip data are continually received, processed, and the despread parameters output therefrom. The process is generally represented by an in-path process block 310 which is disposed between an incoming data path 312 and an output data path 314. The process block 310 represents any process that is facilitated by the DSP in response to receiving an instruction from an instruction generator 316. The various processes that are facilitated by the in-path process block 310 are represented by a plurality of individual process blocks 320. Each of these process blocks 320 represents some predetermined process that utilizes the various resources of the DSP involving such things as adder circuits, accumulator circuits, etc. The instruction generator 316 operates in "instruction cycles" to allow instructions to be sequentially operated. For each instruction cycle, one of the process blocks 320 is disposed in the data path as the in-path process 310 which is operable, for that instruction cycle, to perform the selected one of the processes 320. In this mode, the data on the incoming data path 312 will be processed by the selected process 320 and provide data on the output data path 314, within an instruction cycle. A memory 322 is provided which is interfaced with the in-path process block 310 for use by the selected one of the processes 320 in the event that it needs such a resource.

In the disclosed embodiment, the process for despreading the in-band and quadrature parameters ($r_I$ and $r_Q$, respectively) is performed in response to receiving a single instruction in a single instruction cycle. Therefore, the instruction generator 316 will generate that single instruction, referred to as a QDSP instruction, which instruction must be generated at least at the data rate of the incoming data. However, it should be understood that once the instruction is generated other instructions could be generated if the rate of the instruction cycles were higher than the data rate. This would provide an interleaving operation wherein other processes could be executed between the receipt of the symbol data.

When the data is received, each set of in-band and quadrature components ($r_I$ and $r_Q$) are stored in memory 322, processed by the desired process and the output provided. As will be described herein below, the memory 322 is continually receiving incoming data, since the data is received from a continuous data stream that must be received at the rate it was transmitted. Therefore, as the incoming data is buffered into the memory 322, previously received data will be extracted for the purpose of running the process. This extraction will be in response to generation of the QDSP instruction. On receipt of successive QDSP instructions, the memory pointers for both the incoming signals and the PN code, which must also be stored in the memory 322, will be incremented in order to process the next set of incoming PN code, in-band and quadrature components. For example, if an incoming frame has 64 samples associated therewith, the QDSP instruction will be issued 64 times in a sequential manner and will be generated at a rate equal at least to the data rate to process the incoming frame.

Figure 4:
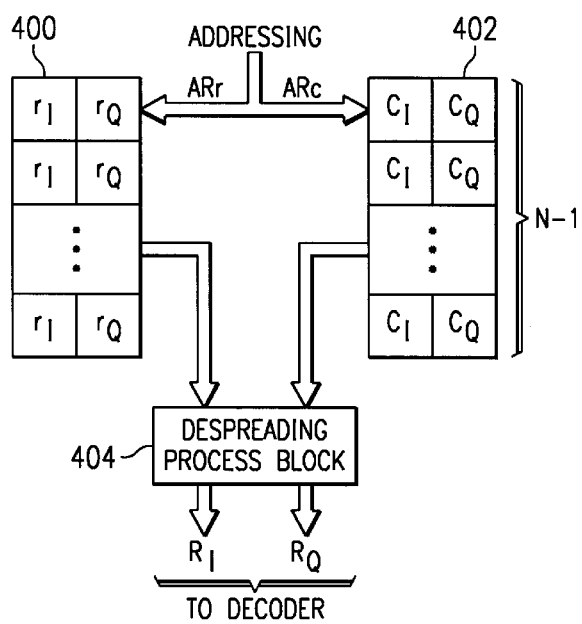
FIG. 4 illustrates the despreading process of values located in memory.

Referring now to FIG. 4, there is illustrated the despreading process for despreading the incoming data stored in the memory 322. The incoming signal values, $r_I(n)$ and $r_Q(n)$, and the PN code values, $c_I(n)$ and $c_Q(n)$, may be stored in circular buffers 400 and 402, respectively, in the memory 322. Alternatively, the PN code parameters, $c_I(n)$ and $c_Q(n)$, need not be stored in circular buffers, since the continual overwriting of registers with incoming data may need only occur with the incoming signal parameters, $r_I(n)$ and $r_Q(n)$, depending on whether the operation is a search operation or a finger operation. A pair of pointers ARr and ARc hold the beginning locations for the $r_I(n)$ and $r_Q(n)$, and the $c_I(n)$ and $c_Q(n)$ samples, respectively. The pointer ARr of the circular buffer containing the $r_I(n)$ and $r_Q(n)$ samples must increment one memory location for each QDSP operation, i.e., modulo N, wherein both $r_I$ and $r_Q$ are stored in a single addressable memory location and buffered during each operation of the instruction. The pointer ARc to the circular buffer containing the PN code samples, $c_I(n)$ and $c_Q(n)$, must increment one memory location for each QDSP operation (i.e., modulo N). The respective incoming and PN code values are read from the circular buffer memories (400 and 402) into a despreading process block 404 which performs the computations which result in the $R_I$ and $R_Q$ outputs. Note that the buffers holding the incoming signal in-band and quadrature samples, $r_I(n)$ and $r_Q(n)$, may hold H*N samples, not just N. This is because there may be more than one set of samples per "chip" time. For example, in the scenario where the chip time comprises N=64 samples, a total of H*N (where H=2), or 128 buffer locations are required. This would be a modulo H*N buffer and would require the address ARr to be incremented by H or 2 for each QDSP instruction.

An alternative buffering option for a modulo H*N configuration would be to store the $r_I(n)$ and $r_Q(n)$ samples into H separate size-N circular buffers. In this way, all circular buffers would be of size N. This modification would make it difficult to input all of the $r_I(n)$ and $r_Q(n)$ values using one DMA channel, which would be preferable. However, it may simplify the design of the circular-buffer pointers. On the other hand, "manual" moves of this data from memory-mapped register locations will introduce an overhead, but these added operations should be tolerable.

In a very generic pseudo language, the despreading process is accomplished with the following command which has two arguments, one for controlling the incoming signal memory location pointer ARr, and the other for controlling the pseudo-noise memory location pointer ARc (which is repeated 64 times at the incoming data rate to obtain the despreading outputs for the 64-bit wide frame of incoming information):

QDSP ARr+2%128, ARc+%64 where "2" indicates an increment-by-2 each time for a modulo H*N configuration since H=2, and "%64" indicates circular buffer address arithmetic of a buffer size=64). The result is then stored in an accumulator.

Currently, the QDSP instruction is more applicable to the initial PN code acquisition and steady-state code search processes because of the combination of chipping and DSP rates. While data demodulation requires a similar process, many channels need to be demodulated—for example, one for each multi-path. The current DSP speeds may not meet these computational requirements. With the rapid advances made in chip fabrication and design, it may be possible to implement the RAKE receiver with the new instruction in a DSP chip, since next generation DSP chips may have the faster processor speeds to accommodate the computational requirements needed for the RAKE receiver.

This QDSP instruction is applicable to the current IS-95 and J-STD-008 CDMA standards, and is very likely to be applicable to most CDMA standards. Applicability depends on the "chipping" rate (1 MHz, 5 MHz, 10 MHz, etc) and the nominal speed of the DSP processor (30 MHz, 60 MHz, etc), and on whether quadrature spreading is used in the communication system.

Figure 5:
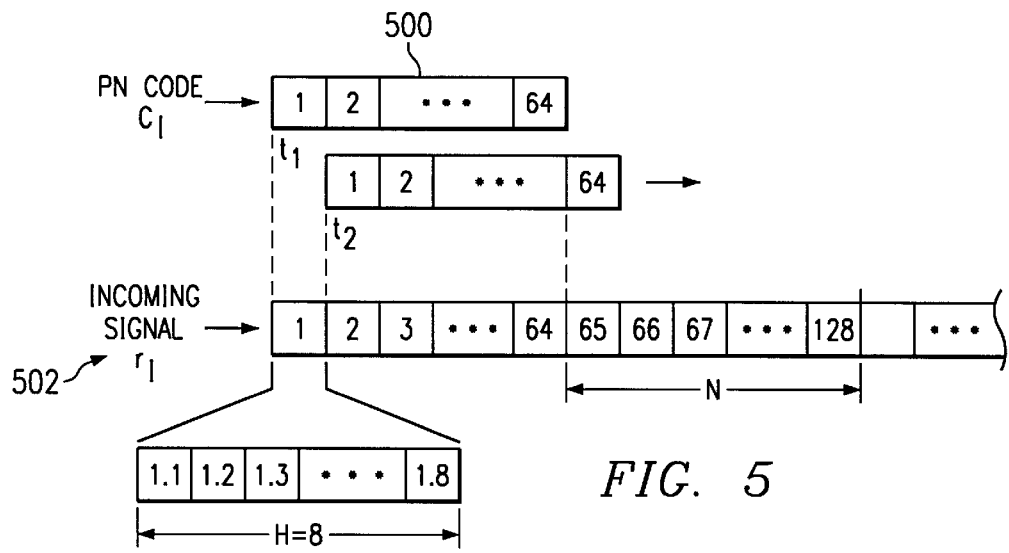
FIG. 5 illustrates the correlation process which occurs between the incoming data and the PN code.

Referring now to FIG. 5, there is illustrated a "sliding window" correlation process which occurs between the incoming data and the PN code during a fast search. (It is not a general "despreading" operation like that which is performed by a finger operation.) A known 64-sample PN code 500 is used to interrogate the incoming signal 502 by sliding the PN code 500 along the incoming signal 502 samples at specified times, $t_1, t_2, \ldots$, to obtain correlation values with the incoming signal 502 data. According to the disclosed embodiment, the QDSP instruction is executed N total times each time period (i.e., for each chip data received) to obtain the quadrature values, $R_I$ and $R_Q$. These values are then stored, in one embodiment, in a circular buffer, as mentioned hereinabove. In this particular embodiment, each $4N^{th}$ sample further comprises eight bits (H=8). Therefore, when using the single instruction for this particular embodiment, the circular buffer pointer ARr is incremented eight locations, as opposed to two (H=2), in the discussion hereinabove. Consequently, 64×8 buffer locations are required.

Figure 6:
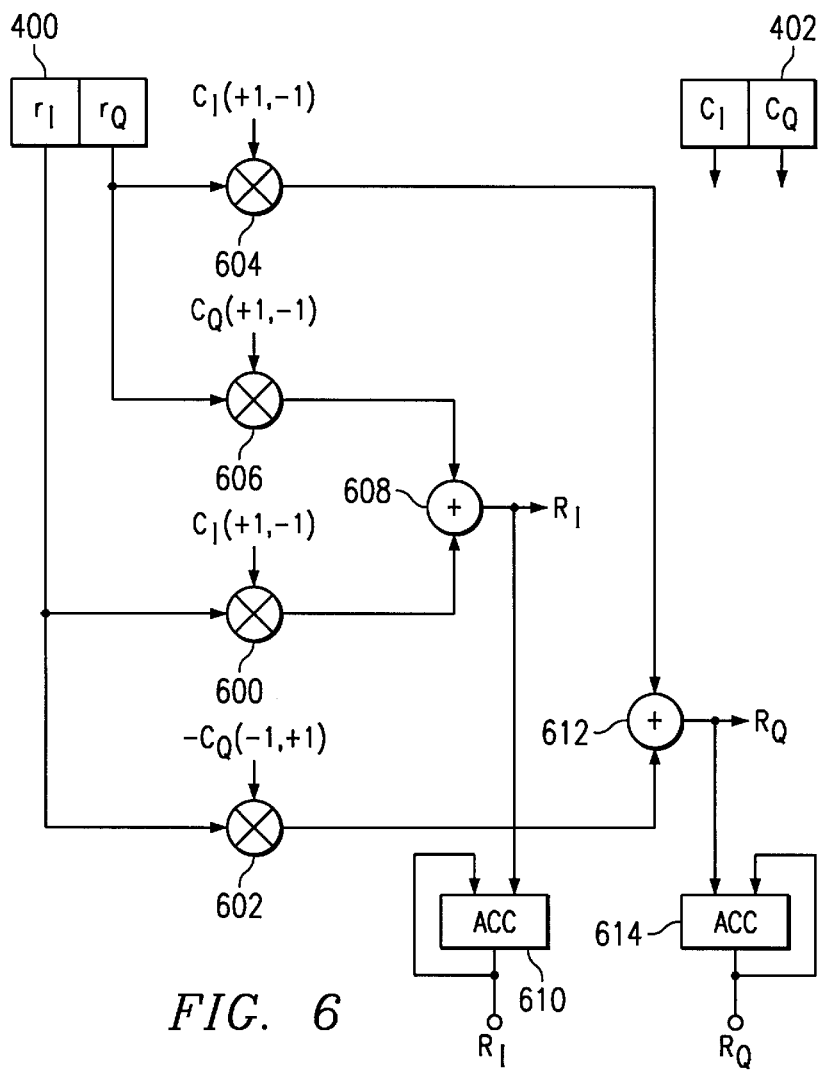
FIG. 6 illustrates a functional block diagram of the "conditional addition" circuit, according to the present disclosed embodiment.

Referring now to FIG. 6, there is illustrated a functional block diagram of the conditional addition circuit according to present invention. Upon receipt of a single QDSP instruction, the contents of the memory locations in memory 400 containing the incoming signal in-band and quadrature values, $r_I$ and $r_Q$, are read from memory and input to the computational circuit. As mentioned hereinabove, the PN code values $c_I$ and $c_Q$ also operate on the incoming signal values to produce the despread components $R_I$ and $R_Q$. The in-band component $r_I$ of the incoming signal is input to both a multiplier 600 and a multiplier 602 which multiplier 600 and 602 also receive the PN code in-band and quadrature components, $c_I$ and $c_Q$. Multiplier 600 multiplies $r_I$ by $c_I$, and multiplier 602 multiplies $r_I$ by $-c_Q$. Since $c_I$ and $c_Q$ are values of ±1, then the multiplication operation merely requires determining the two's complement of the in-band component $r_I$ to change the sign thereof. Additionally, the incoming signal $r_Q$ component is fed into two multipliers 604 and 606, which multipliers 604 and 606 also receive the PN code $c_I$ and $c_Q$ components Multiplier 604 multiplies $r_Q$ by $c_I$, and multiplier 606 multiplies $r_Q$ by $c_I$. The outputs of multiplier blocks 600 and 606 are then summed with a summer 608 to produce the $R_I$ despread value, which output value $R_I$ is then fed into an accumulator 610. Similarly, the outputs of the multiplier blocks 602 and 604 are summed together with a summer 612, the output of which is the $R_Q$ despread component. This output $R_Q$ is then fed to an accumulator 614 for accumulation.

As described hereinabove, whenever the QDSP instruction is executed, the in-band and quadrature components ($r_I$ and $r_Q$) are extracted from the memory 400, the corresponding PN code data ($c_I$ and $c_Q$) are extracted from memory 402 and the process carried out as described hereinabove with reference to FIG. 6. This all occurs in a single instruction cycle. Upon execution of the QDSP instruction, the memories 400 and 402 are incremented (or they could be incremented at the end of the previous instruction) and the next data processed. This allows a single instruction to be generated in a single instruction cycle which carries out the process. For the minimum rate of instruction generation, the instructions must be generated at the data rate to keep up with the incoming data. However, the rate of the generation of the QDSP instructions as a whole can be no greater than the data rate for a given frame of data. Therefore, the incoming data will be input to and extracted from the memory 400 at the data rate, which is also that for the generation of the QDSP instruction signals.

Although the preferred embodiment has been described in detail, it should be understood that various changes, substitutions and alterations can be made therein without departing from the spirit and scope of the invention as defined by the appended claims.

What is claimed is:

1. A method of despreading a spread spectrum signal, comprising the steps of:

receiving a continuous digital data stream of encoded symbol data at a deferred and associated data rate;

storing the received symbol data in a buffer; and processing the received and buffered symbol data in a digital processing device by generating a plurality of single process instructions at least at the associated data rate, which each single process instruction is operable to generate despread symbol data for a given single symbol in the received symbol data;

wherein the symbol data comprises an in-band component $r_I$ and a quadrature component $r_Q$ of each of the symbols in the digital data stream;

wherein the in-band and quadrature components, $r_I$ and $r_Q$, of each of the symbols in the received digital data stream are despread to provide a despread in-band component $R_I$ and a despread quadrature component $R_Q$ as a despread symbol; extracting $r_I$ and $r_Q$ for a given symbol in the received symbol data; processing $r_I$ and $r_Q$ in accordance with a predetermined despreading algorithm to produce the despread in-band component $R_I$ and despread quadrature component $R_Q$ for the given symbol;

wherein symbol data is arranged in frames, and the plurality of single process instructions operate each over a frame of symbol data;

wherein the received digital data stream is despread with a pseudo-noise code;

storing the pseudo-noise code having an in-band component $c_I$ and a quadrature component $c_Q$ in the buffer;

extracting corresponding $c_I$ and $c_Q$ data of the $r_I$ and $r_Q$ components from the buffer for each symbol processed;

processing $r_I$, $r_Q$, $c_I$, and $c_Q$ data according to a despreading algorithm for each of the symbols in the received symbol data; and wherein the next single process instruction operates on the next symbol data in the received digital data stream.

2. The method of claim 1, wherein the despread in-band component $R_I$ and the despread quadrature component $R_Q$ are produced according to the following equations where N is the number of frames in a received frame and n is the symbol being processed:

$$R_I = \sum_{n=0}^{N-1} (r_I(n)c_I(n) + r_Q(n)c_Q(n))$$

and $$R_Q = \sum_{n=0}^{N-1} (-r_I(n)c_Q(n) + r_Q(n)c_I(n)).$$

3. The method of claim 1, wherein the single processing instruction is generated at a rate equal to the data rata of the digital data stream.

4. An architecture for despreading spread spectrum signals, comprising:

an input for receiving a continuous digital data stream of encoded symbol data at a defined and associated data rate;

a buffer for storing said symbol data when received;

a digital processing device for processing said received and buffered symbol data by generating a plurality of single process instructions in sequence at least at said associated data rate, which each said single process instruction is operable to generate a despread symbol for a given single symbol in the received symbol data;

wherein said symbol data comprises an in-band component $r_I$ and a quadrature component $r_Q$ of said digital data stream;

wherein said in-band and quadrature components, $r_I$ and $r_Q$, of said digital data stream are despread to provide a despread in-band component $R_I$ and a despread quadrature component $R_Q$ for each of the received symbols;

wherein said in-band and quadrature components, $r_I$ and $r_Q$, are extracted for a given symbol in the received symbol data, and said in-band and quadrature components, $r_I$ and $r_Q$, are processed in accordance with a predetermined despreading algorithm to produce said despread in-band component $R_I$ and said despread quadrature component $R_Q$;

wherein said symbol data is arranged in frames, and said plurality of single process instructions operate over a frame of said symbol data;

wherein said received digital data stream is despread with a pseudo-noise code;

wherein said pseudo-noise code having an in-band component $c_I$ and a quadrature component $c_Q$ for each of the symbols received in a frame of data, is stored in said buffer, and wherein corresponding $c_I$ and $c_Q$ data of said $r_I$ and $r_Q$ components are extracted from said buffer, and $r_I$, $r_Q$, $c_I$, and $c_Q$ are processed according to said despreading algorithm; and wherein said next single process instruction in said sequence operates on the next of said symbols in said symbol data in said received digital data stream.

5. The architecture of claim 4, wherein said despread in-band component $R_I$ and said despread quadrature component $R_Q$, are produced according to the following equations for N equal to the number of symbols in a received frame of data:

$$R_I = \sum_{n=0}^{N-1} (r_I(n)c_I(n) + r_Q(n)c_Q(n))$$

and $$R_Q = \sum_{n=0}^{N-1} (-r_I(n)c_Q(n) + r_Q(n)c_I(n)).$$

6. The architecture of claim 4, wherein said single processing instruction is generated at a rate equal to said data rata of said digital data stream.

7. A method of despreading a spread spectrum signal, comprising the steps of:

storing components of an incoming encoded spectrum signal, and components of a pseudo-noise signal, in a memory, the incoming signal having a defined data rate;

processing the components of the incoming signal and the components of the pseudo-noise signal with a processing circuit which interfaces to the memory; and performing a computational operation on the components of the incoming signal and the components of the pseudo-noise code signal, with an operation circuit, which produces the despreading values, $R_I$ and $R_Q$, for each symbol processed according to the following equations with N equal to the number of symbols in a frame of received data and n equal the symbol being processed:

$$R_I = \sum_{n=0}^{N-1} (r_I(n)c_I(n) + r_Q(n)c_Q(n))$$

and $$R_Q = \sum_{n=0}^{N-1} (-r_I(n)c_Q(n) + r_Q(n)c_I(n))$$

wherein a single instruction generated at least at the data rate of the incoming signal initiates the computational operation on the components of the incoming signal and the components of the pseudo-noise to produce a despreading value.

8. The method of claim 7, wherein the components of the incoming signal are in-band and quadrature values of the incoming signal, and the components of the pseudo-noise signal are in-band and quadrature values of the pseudo-noise signal, such that the in-band and quadrature values of the incoming signal are extracted from the memory and multiplied, using a multiplier, with the in-band and quadrature values of the pseudo-noise signal.

9. The method of claim 8, comprising the step of summing the outputs of the multipliers, with summers prior to producing the despreading values $R_I$ and $R_Q$.

10. The method of claim 9, comprising the step of passing the outputs of the summers to accumulators, the output of the accumulators being the despreading values $R_I$ and $R_Q$.

11. A method of despreading a spread spectrum signal, comprising the steps of:

storing components of an incoming encoded spread spectrum signal having a defined data rate and components of a pseudo-noise signal, in a memory;

processing the components of the incoming signal and the components of the pseudo-noise signal with a processing circuit which interfaces to the memory; and said memory using an incoming signal memory pointer ARr, and a pseudo-noise memory pointer ARc to point to respective memory locations, in accordance with a single instruction;

performing a computational operation on the components of the incoming signal and the components of the pseudo-noise code signal, with an operation circuit;

wherein said single instruction generated at least at the data rate of the incoming signal initiates the computational operation on the components of the incoming signal and the components of the pseudo-noise to produce a despreading value.

12. The method of claim 11, comprising operating the single instruction, QDSP, on first and second arguments, the first argument controlling the incoming signal memory pointer ARr, and the second argument controlling the pseudo-noise memory pointer ARc.

13. A digital signal processing architecture, comprising:

a processing circuit for processing components of an encoded incoming signal and components of a pseudo-noise signal, said incoming signal having a defined data rate;

a memory which interfaces to said processing circuit, and stores said components of said incoming signal and said components of said pseudo-noise signal; and an operation circuit for a providing a computational operation on said components of said incoming signal and said components of said pseudo-noise signal producing the despreading values, $R_I$ and $R_Q$, for each symbol processed according to the following equations where N is the number of symbols in a frame of received data and n is the symbol being processed:

$$R_I = \sum_{n=0}^{N-1} (r_I(n)c_I(n) + r_Q(n)c_Q(n))$$

and $$R_Q = \sum_{n=0}^{N-1} (-r_I(n)c_Q(n) + r_Q(n)c_I(n)); \quad \text{and}$$

wherein a single instruction issued to said processing circuit initiates said computational operation on said components of said incoming signal and said components of said pseudo-noise signal at a rate at least as fast as said data rate of said incoming signal, to produce a despreading value.

14. The architecture of claim 13, wherein said components of said incoming signal are in-band and quadrature values, and said components of said pseudo-noise signal are in-band and quadrature values, such that said in-band and quadrature values of said incoming signal are extracted from said memory, and multiplied with said in-band and quadrature values of said pseudo-noise signal, using multipliers.

15. The architecture of claim 14, wherein the outputs of said multipliers are summed with summers prior to producing said despreading values $R_I$ and $R_Q$.

16. The architecture of claim 15, wherein the outputs of said summers are passed to accumulators, the output of said accumulators being said despreading values $R_1$ and $R_Q$.

17. A digital signal processing architecture, comprising:

a processing circuit for processing components of an encoded incoming signal and components of a pseudo-noise signal, said incoming signal having a defined data rate;

a memory which interfaces to said processing circuit, and stores said components of said incoming signal and said components of said pseudo-noise signal, said memory uses an incoming signal memory pointer ARr, and a pseudo-noise memory pointer ARc to point to respective said memory locations, in accordance with a single instruction; and an operation circuit for a providing a computational operation on said components of said incoming signal and said components of said pseudo-noise signal;

wherein said single instruction is issued to said processing circuit and initiates said computational operation on said components of said incoming signal and said components of said pseudo-noise signal at a rate at least as fast as said data rate of said incoming signal, to produce a despreading value.

18. The architecture of claim 17, wherein said single instruction, QDSP, operates on first and second arguments, said first argument controlling said incoming signal memory pointer ARr, and said second argument controlling said pseudo-noise memory pointer ARc.

* * * * *